US010115999B2

(12) United States Patent
Ohuchi et al.

(10) Patent No.: US 10,115,999 B2
(45) Date of Patent: Oct. 30, 2018

(54) ALL-SOLID-STATE LITHIUM-ION SECONDARY BATTERY INCLUDING A SOLID ELECTROLYTE AND AN INTERMEDIATE LAYER

(71) Applicant: Panasonic Intellectual Property Management Co., Ltd., Osaka (JP)

(72) Inventors: Satoru Ohuchi, Osaka (JP); Yuta Sugimoto, Hyogo (JP); Toshiro Kume, Hyogo (JP); Tomoyasu Yokoyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 195 days.

(21) Appl. No.: 15/158,630

(22) Filed: May 19, 2016

(65) Prior Publication Data

US 2016/0351950 A1    Dec. 1, 2016

(30) Foreign Application Priority Data

May 26, 2015  (JP) ................. 2015-106287

(51) Int. Cl.
*H01M 10/0525* (2010.01)
*H01M 10/0585* (2010.01)
*H01M 4/525* (2010.01)
*H01M 10/0562* (2010.01)

(52) U.S. Cl.
CPC ....... *H01M 10/0525* (2013.01); *H01M 4/525* (2013.01); *H01M 10/0562* (2013.01); *H01M 10/0585* (2013.01)

(58) Field of Classification Search
None
See application file for complete search history.

(56) References Cited

U.S. PATENT DOCUMENTS

2007/0077496 A1*  4/2007  Scott ............... H01M 4/587
                                              429/326
2009/0081554 A1   3/2009  Takada et al.

FOREIGN PATENT DOCUMENTS

WO       2007/004590       1/2007

OTHER PUBLICATIONS

Hausbrand, A surface science approach to cathode/electrolyte interfaces in Li-ion batteries: Contact properties, charge transfer and reactions, Apr. 18, 2014, Progress in Solid State Chemistry, 42, 175-183 (Year: 2014).*

(Continued)

*Primary Examiner* — Sarah A. Slifka
*Assistant Examiner* — Haroon S. Sheikh
(74) *Attorney, Agent, or Firm* — McDermott Will & Emery LLP (57) ABSTRACT

An all-solid-state lithium-ion secondary battery includes a cathode active material, an anode active material, a solid electrolyte between the cathode and anode active materials, and an intermediate layer between the solid electrolyte and the cathode active material. The cathode and anode active materials are able to store and release a lithium ion. The solid electrolyte has lithium ion conductivity. The intermediate layer is constituted of elements including all elements constituting the cathode active material. A lithium ion in the intermediate layer is less ionic than that in the cathode active material.

4 Claims, 4 Drawing Sheets

(56) References Cited

OTHER PUBLICATIONS

Masakazu Haruta et al., "Negligible "Negative Space-Charge Layer Effects" at Oxide-Electrolyte/Electrode Interfaces of Thin-Film Batteries", Nano Letters 2015,15, pp. 1498-1502.
Jun Kikkawa et al., "Understanding Li—K edge structure and interband transitions in LixCoO2 by electron energy-loss spectroscopy", Applied Physics Letters 104, 114105, 2014.
V. Mauchamp et al., "EELS study of Li-based materials: ELNES at the lithium K-edge and low energy losses", Book of Abstracts, EDGE 2005, p. 126.

* cited by examiner

ALL-SOLID-STATE LITHIUM-ION SECONDARY BATTERY INCLUDING A SOLID ELECTROLYTE AND AN INTERMEDIATE LAYER

BACKGROUND

1. Technical Field

The present disclosure relates to an all-solid-state lithium-ion secondary battery and method for manufacturing that.

2. Description of the Related Art

In recent years, all-solid-state lithium-ion secondary batteries (hereinafter "all-solid-state batteries"), which are composed solely of solid components including an electrolyte, have been receiving attention. A disadvantage of all-solid-state batteries as compared with organic liquid electrolyte-based batteries is that they do not charge and discharge quickly due to high resistance at the interface between a cathode active material and a solid electrolyte.

As a solution to this, Masakazu Haruta et al. discloses a method for reducing the interface resistance of all-solid-state batteries in which the cathode active material and the solid electrolyte are $LiCoO_2$ and LiPON (a nitride of lithium phosphate), respectively (*Nano Letters* 15, 1498 (2015)). With this method, the reduction of the interface resistance is achieved through the formation of a high-quality interface. This method includes forming a $LiCoO_2$ layer and a LiPON layer sequentially by PLD (pulsed laser deposition) and sputtering, respectively, in an ultrahigh vacuum. During the formation of the LiPON layer by sputtering, the target and the substrate are positioned off-axis.

Japanese Patent No. 4982866 discloses a configuration in which $LiNbO_3$ is disposed between layers of $LiCoO_2$ as a cathode active material and $Li_2S$—$P_2S_5$ as a solid electrolyte.

SUMMARY

One non-limiting and exemplary embodiment provides an all-solid-state battery that can charge and discharge quickly because of the low resistance between its cathode active material and solid electrolyte. Another non-limiting and exemplary embodiment provides a method for manufacturing such a battery.

An all-solid-state lithium-ion secondary battery according an aspect of the present disclosure includes: a cathode active material that allows a lithium ion to be stored therein and released therefrom; an anode active material that allows a lithium ion to be stored therein and released therefrom; a solid electrolyte between the cathode active material and the anode active material, the solid electrolyte having lithium ion conductivity; and an intermediate layer between the solid electrolyte and the cathode active material, the intermediate layer being constituted of elements including all elements constituting the cathode active material, a lithium ion in the intermediate layer being less ionic than the lithium ion stored in the cathode active material.

This all-solid-state lithium-ion secondary battery can charge and discharge quickly because of the low resistance between its cathode active material and solid electrolyte.

It should be noted that comprehensive or specific embodiments may be implemented as a method for manufacturing, for example.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

The battery disclosed in Masakazu Haruta et al., *Nano Letters* 15, 1498 (2015) is able to charge and discharge despite the fact that the lithium atomic layers in the $LiCoO_2$ layer are parallel to the interface between the $LiCoO_2$ and LiPON films. This suggests that the $LiCoO_2$ layer contains many grain boundaries, in the region from its surface to a certain depth, as a place for lithium ions to be extracted. In light of the fact that the $LiCoO_2$ layer is maintained in an ultrahigh vacuum after being formed, the grain boundaries should be in a highly chemically active state in which there remain many dangling bonds. When a LiPON layer is formed on a $LiCoO_2$ layer in such a state, an extreme chemical reaction corrodes the $LiCoO_2$ layer, leaving a damaged layer between the two layers. This damaged layer, inert and not highly conductive to lithium ions, should be a cause of increased resistance between the $LiCoO_2$ and LiPON layers.

The technology disclosed in Japanese Patent No. 4982866 requires a highly accurate process to deposit an intermediate layer as thin as several nanometers on a cathode active material. The resulting significant increases in material and process costs can make this technology unsuitable for commercial mass production.

Embodiment Outline

An all-solid-state lithium-ion secondary battery according to a first aspect of the present disclosure has a cathode active material, an anode active material, a solid electrolyte between the cathode and anode active materials, and an intermediate layer between the solid electrolyte and the cathode active material. The cathode and anode active materials are able to store and release lithium ions. The solid electrolyte is conductive to lithium ions. The intermediate layer contains all elements constituting the cathode active material. Lithium atoms constitutive of the intermediate layer have a less ionic electronic state than those constitutive of the cathode active material.

With this battery, the ionicity of the electronic state of lithium ions constitutive of the intermediate layer, lower than that of lithium ions constitutive of the cathode active material, aids in the conduction of lithium ions through the intermediate layer. This reduces the resistance between the cathode active material and the solid electrolyte, thereby allowing the battery to charge and discharge quickly.

In addition, this battery allows the manufacturer to reduce the material cost by using the same material for the cathode active material and the intermediate layer.

In a second aspect of the present disclosure, the cathode active material is lithium cobalt oxide.

In a third aspect of the present disclosure, the energy level of the rise of the Li K-edge of the intermediate layer in an EELS spectrum is lower than that of the rise of the Co $M_{2,3}$-edge of the intermediate layer by 1 eV or more.

In a fourth aspect of the present disclosure, the intermediate layer does not contain any constitutive element of the solid electrolyte unless it is a constitutive element of the cathode active material.

A method according to a fifth aspect of the present disclosure for manufacturing an all-solid-state lithium-ion secondary battery includes forming a cathode active material in a vacuum and exposing the cathode active material to an inert atmosphere having a water content of 0.05 ppm or more and 1.5 ppm or less by volume.

This ensures moderate surface activity of the cathode active material, thereby allowing for the formation of an intermediate layer highly conductive to lithium ions. An intermediate layer may be formed simultaneously with a solid electrolyte. This allows the manufacturer to produce quick-charge and -discharge all-solid-state batteries at lower cost.

The following describes an all-solid-state battery and a method for manufacturing it according to various embodiments. The components in the drawings are not necessarily to scale.

Embodiment

Figure 1:
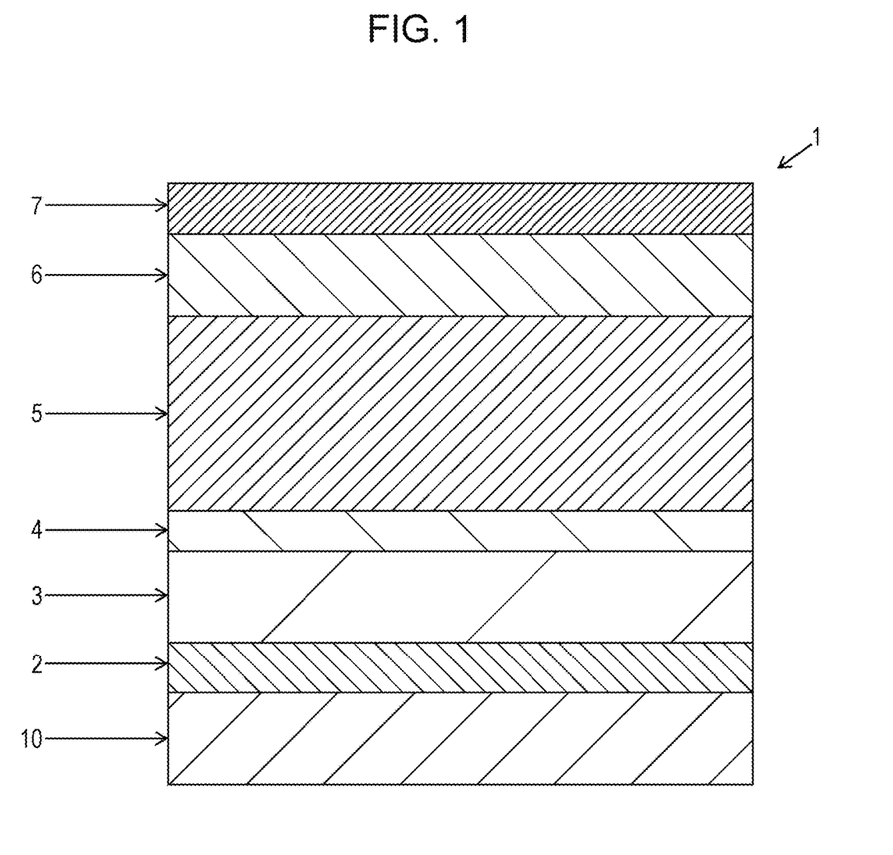
FIG. 1 is a schematic cross-section illustrating the configuration of an all-solid-state battery according to an embodiment.

FIG. 1 is a schematic cross-section illustrating the configuration of an all-solid-state battery 1 according to this embodiment.

The all-solid-state battery 1 is in the shape of, for example, a thin-film battery. The all-solid-state battery 1 has a cathode active material 3, an intermediate layer 4, a solid electrolyte 5, and an anode active material 6, which are disposed between a cathode collector 2 and an anode collector 7.

In FIG. 1, the cathode collector 2, the cathode active material 3, the solid electrolyte 5, the anode active material 6, and the anode collector 7 are stacked in this order on one principal surface of a substrate 10. The intermediate layer 4 may be formed simultaneously with the solid electrolyte 5. Alternately, the intermediate layer 4 may be formed after the formation of the cathode active material 3 and before the formation of the solid electrolyte 5.

[Substrate]

The substrate 10 serves as a base of the all-solid-state battery 1 and is made of, for example, an insulating material, such as magnesium oxide, alumina, strontium titanium oxide ($SrTiO_3$), glass, or resin.

[Cathode Collector]

The cathode collector 2 may be, for example, a metallic film, such as a platinum or gold film, or a conductive oxide film, such as an indium tin oxide or strontium ruthenium oxide ($SrRuO_3$) film. Alternatively, the cathode collector 2 may be a stack of two or more such films.

[Cathode Active Material]

The cathode active material 3 is, for example, a $LiCoO_2$ layer. Since the most stable plane of $LiCoO_2$ is the (001) plane, $LiCoO_2$ layers are typically (001)-oriented. However, a $LiCoO_2$ layer having an orientation other than (001) or in a polycrystalline structure may also be used. The use of such a $LiCoO_2$ layer can help lithium ions to travel between the cathode active material 3 and the solid electrolyte 5.

[Intermediate Layer]

The intermediate layer 4 contains the elements constituting the cathode active material 3 and no or only negligible amounts of elements that are constitutive of the solid electrolyte 5 but not constitutive of the cathode active material 3. The electronic state of lithium ions in the intermediate layer 4 is less ionic than that of lithium ions constitutive of the cathode active material 3. This enables the intermediate layer 4 to be highly conductive to lithium ions. The intermediate layer 4 is, furthermore, easy to form because it contains the same elements as the cathode active material 3 is constituted of.

The intermediate layer 4 may be amorphous or crystalline, or stack of amorphous and/or crystalline layers. For example, the intermediate layer 4 has a crystal system similar to that of the cathode active material 3, and a lattice constant greater than that of the cathode active material 3. This enables the above-noted electronic state to be surely achieved.

[Solid Electrolyte]

The solid electrolyte 5 is, for example, an amorphous LiPON layer. The solid electrolyte 5 is not limited to this and can be, for example, a crystalline oxide solid electrolyte, such as LLTO, LLZO, or LATP, or a sulfide-based glass-ceramic solid electrolyte, such as $Li_2S$—$P_2S_5$.

[Anode Active Material]

The anode active material 6 is, for example, a film of metallic lithium. The anode active material 6 is not limited to this and may be, for example, a film of metallic indium or a lithium-indium alloy film.

[Anode Collector]

The anode collector 7 is made of, for example, a conductive material through which lithium is poorly diffusible, thus preventing short-circuiting due to lithium diffusion.

[Advantages of the All-Solid-State Battery]

The intermediate layer 4 of the all-solid-state battery 1 contains the same elements as the cathode active material 3. This allows the manufacturer to reduce the material cost by using the same material for the intermediate layer 4 and the cathode active material 3. Furthermore, the electronic state of lithium ions constitutive of the intermediate layer 4 is less ionic than that of lithium ions constitutive of the cathode active material 3. This makes the intermediate layer 4 highly conductive to lithium ions so as to lower the resistance between the cathode active material 3 and the solid electrolyte 5, thereby allowing the battery to charge and discharge quickly.

[Example of the All-Solid-State Battery and Its Manufacture]

The configuration of an all-solid-state battery 1 of Example will be as follows. The substrate 10 in Example was a $SrTiO_3$ substrate whose principal surface was the (100) plane. The cathode collector 2 in Example was a (100)-oriented 80 nm thick $SrRuO_3$ film. The cathode active material 3 in Example was a (104)-oriented $LiCoO_2$ film. The intermediate layer 4 in Example was a layer that contained Li, Co, and O and was substantially free of P and N. The solid electrolyte 5 in Example was a 1000 nm thick amorphous LiPON film. The anode active material 6 was a 200 nm thick metallic lithium film. The anode collector 7 in Example was a 200 nm thick metallic copper film.

The manufacture of the all-solid-state battery 1 of Example will be as follows.

A $SrTiO_3$ substrate 10 having a flat (100) surface was conveyed to an ultrahigh vacuum chamber of a PLD (pulsed laser deposition) system. Oxygen was introduced into the chamber, and an 80 nm thick (100)-oriented $SrRuO_3$ film (the cathode collector 2) was formed by PLD using a $SrRuO_3$ pellet as target. In this PLD process, a 248 nm KrF excimer laser was used for ablation, the oxygen partial pressure was 7 Pa, the substrate temperature was 600° C., the target-substrate distance was 5 cm, the laser pulse frequency was 10 Hz, and the laser dose was 1.6 $J/cm^2$.

Oxygen was introduced into the chamber, and a 500 nm thick (104)-oriented $LiCoO_2$ film (the cathode active material 3) was formed by PLD using a $LiCoO_2$ pellet as target. In this PLD process, the oxygen partial pressure was 1 Pa, the substrate temperature was 600° C., the target-substrate distance was 5 cm, the laser pulse frequency was 10 Hz, and the laser dose was 1.6 $J/cm^2$.

With the cathode collector 2 and the cathode active material 3 stacked thereon, the substrate 10 was transferred from the chamber of the PLD system to a chamber for exposure to water. A vacuum conveyor or a transfer vessel was used to maintain the vacuum during the transfer. In the water exposure chamber, the substrate was exposed to an inert gas atmosphere at room temperature and atmospheric pressure containing a slight amount of water that corresponds to a volume fraction of 0.05 ppm or more and 1.5 ppm or less. The inert gas may be any gas inert to lithium, such as argon gas. The gaseous impurities content of the atmosphere is, for example, less than 0.1 ppm. The water exposure chamber may be, for example, a tightly sealed glovebox.

In this process, the surface of the $LiCoO_2$-based cathode active material 3 transitions from a vacuum environment directly into an inert gas atmosphere that contains only a controlled, slight amount of water and is almost free of oxygen, carbon dioxide, nitrogen, and other gaseous impurities. As a result, the surface of the cathode active material 3 reacts only with the slight amount of water in the inert gas, and thereby most of the dangling bonds on the surface of the cathode active material 3 are terminated with hydroxy groups. The inventors confirmed, by infrared spectroscopy, the presence of hydroxy termination on the surface of the cathode active material 3 and, by TEM-EELS, that the region between the cathode active material 3 and the solid electrolyte 5 contained no or only negligible amounts of impurities such as C and N.

The surface of the freshly formed cathode active material 3 is highly active in a vacuum because of many dangling bonds it retains. After hydroxy termination with a slight amount of water, the surface of the cathode active material 3 is relatively inert because there are few dangling bonds on it. This can prevent, during the deposition of the solid electrolyte 5 by sputtering (described hereinafter), a damaged layer from being formed that would inhibit the conduction of lithium ions. Furthermore, the moderate reactivity of the hydroxy-terminated surface of the cathode active material 3 allows for the formation of an intermediate layer 4 highly conductive to lithium ions.

Then the substrate 10, with the cathode collector 2 and the cathode active material 3 stacked thereon, was transferred from the water exposure chamber to a vacuum chamber of a sputtering system using a vacuum conveyor or a transfer vessel. Nitrogen, for use as sputtering and reactive gases, was introduced into the chamber, and a 1000 nm LiPON film (the solid electrolyte 5) was formed by reactive sputtering using $Li_3PO_4$ as target. In this process, the substrate temperature was not controlled, the nitrogen partial pressure (equal to total pressure) was 1 Pa, the target-substrate distance was 4 cm, the target size (diameter) was 4 inches, and the power applied was 200 W.

During this process, the surface of the $LiCoO_2$-based cathode active material 3 is exposed to substances such as nitrogen ions, plasma, and lithium constitutive of the target $Li_3PO_4$ and thereby reacts with these substances. Through these reactions, an intermediate layer 4 is formed. The solid electrolyte 5 was formed on this layer.

Before the reactions, the surface of the cathode active material 3 is relatively inert because it has been terminated with hydroxy groups. The reactions therefore form an intermediate layer 4 that is different from the aforementioned damaged layer. Lithium ions in the intermediate layer 4 are less ionic than those in the cathode active material 3. Thus, the intermediate layer 4 is highly conductive to lithium ions.

The intermediate layer 4 may be formed by any method that ensures the resulting intermediate layer 4 meets the following conditions (1) and (2): (1) The intermediate layer 4 contains all elements constituting the cathode active material 3; (2) Lithium ions in the intermediate layer 4 are less ionic than those in the cathode active material 3. For example, it is possible to form an intermediate layer 4 on the cathode active material 3 and then place a separate solid electrolyte 5.

With the cathode collector 2, the cathode active material 3, the intermediate layer 4, and the solid electrolyte 5 stacked thereon, the substrate 10 was then conveyed into a vacuum evaporator. A layer of metallic lithium as anode active material 6 and a layer of copper as anode collector 7 were each deposited to a thickness of 200 nm using resistance heating evaporation and electron beam evaporation.

Through these processes, the all-solid-state battery 1 of Example was completed.

[Experiment and Discussion]

The following discusses the effectiveness of the intermediate layer 4 according to this embodiment using the all-solid-state battery 1 of Example described above and an all-solid-state battery prepared as Comparative Example. The all-solid-state battery of Comparative Example was fabricated through the same processes as that of Example, except that the surface of its cathode active material 3 was excessively hydroxy-terminated with an excess of water.

Example and Comparative Example were conveyed to an argon-filled glovebox without atmospheric exposure and subjected to a charge-discharge test in the glovebox. More specifically, the batteries were subjected to two cycles of charge and discharge at room temperature, each cycle consisting of charge to 4.2 V at a fixed rate of 5 C and subsequent discharge to 2.0 V at a fixed rate of 5 C.

After the two cycles of charge and discharge, Example and Comparative Example were each processed by focused ion beam milling within a region including the cathode active material 3 and the solid electrolyte 5 so as to obtain a sample for the evaluation of a cross-section. The samples were analyzed through TEM (transmission electron microscope) observation for the structure of the cross-section, TEM-EDS (energy dispersive X-ray spectrometry) for elemental compositions, and TEM-EELS (electron energy loss spectroscopy) for electronic states. During the measurement, each test sample was placed in a holder cooled in liquid nitrogen so that the cathode active material 3, the intermediate layer 4, and the solid electrolyte 5 would be protected from alteration due to the irradiation with electron beams.

Figure 2:
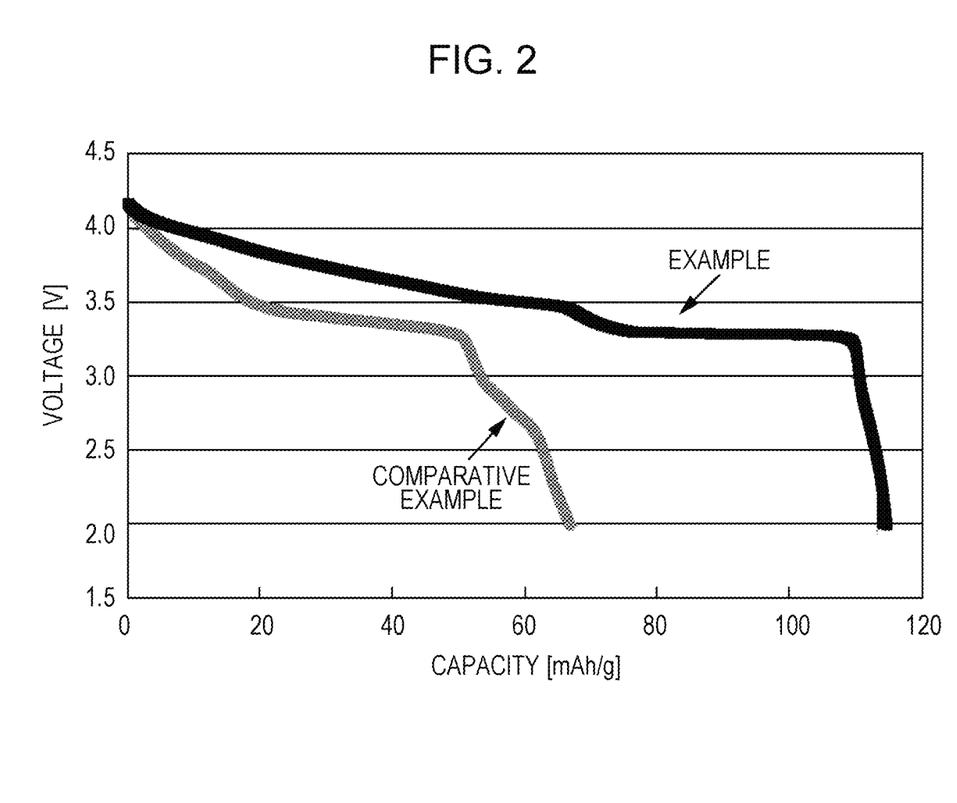
FIG. 2 illustrates the charge-discharge curves of an all-solid-state battery prepared as Example and one prepared as Comparative Example.

FIG. 2 illustrates the charge-discharge curves of Example and Comparative Example in the second cycle. Example had a capacity of 115 mAh/g, whereas Comparative Example had 67 mAh/g. This result indicates that Example was compatible with quick charge and discharge while Comparative Example was not. This is presumably because in Example, an intermediate layer 4 allowed lithium ions to travel between the cathode active material 3 and the solid electrolyte 5 whereas in Comparative Example, the interface between the cathode active material 3 and the solid electrolyte 5 was not as conductive to lithium ions.

Figure 3A:
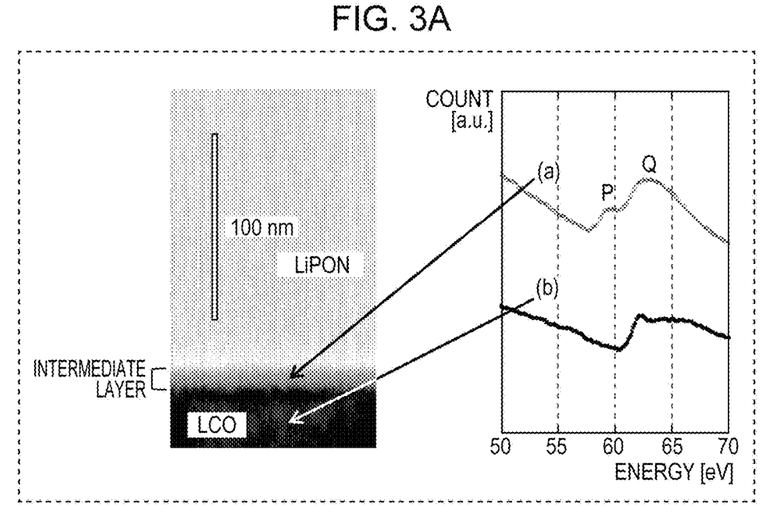
FIG. 3A is a cross-sectional TEM image of the battery of Example, along with TEM-EELS spectra at certain points in the cross-section.
Figure 3B:
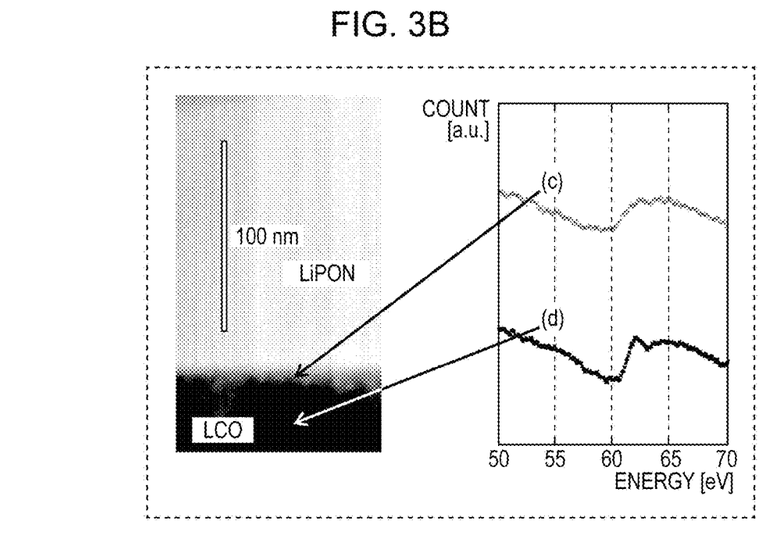
FIG. 3B is a cross-sectional TEM image of the battery of Comparative Example, along with TEM-EELS spectra at certain points in the cross-section.

FIGS. 3A and 3B are cross-sectional TEM images of Example and Comparative Example, respectively, after the two cycles of charge and discharge taken in a region from the cathode active material 3 to the solid electrolyte 5, along with Li K-edge TEM-EELS spectra at certain points in the cross-section.

The cross-sectional TEM image in FIG. 3A demonstrates that in Example, an intermediate layer 4 was formed between the cathode active material 3 and the solid electrolyte 5. High resolution observation and electron beam diffraction (not illustrated) found no crystal structure in the intermediate layer 4, thus indicating that the intermediate layer 4 was distinct from the $LiCoO_2$ crystal-based cathode active material 3. The TEM-EDS elemental analysis revealed that the intermediate layer 4 contained the constitutive elements of the $LiCoO_2$-based cathode active material 3, i.e., Li, Co, and O, and no or only negligible amounts of P and N, which were constitutive of the LiPON-based solid electrolyte 5.

Figure 4:
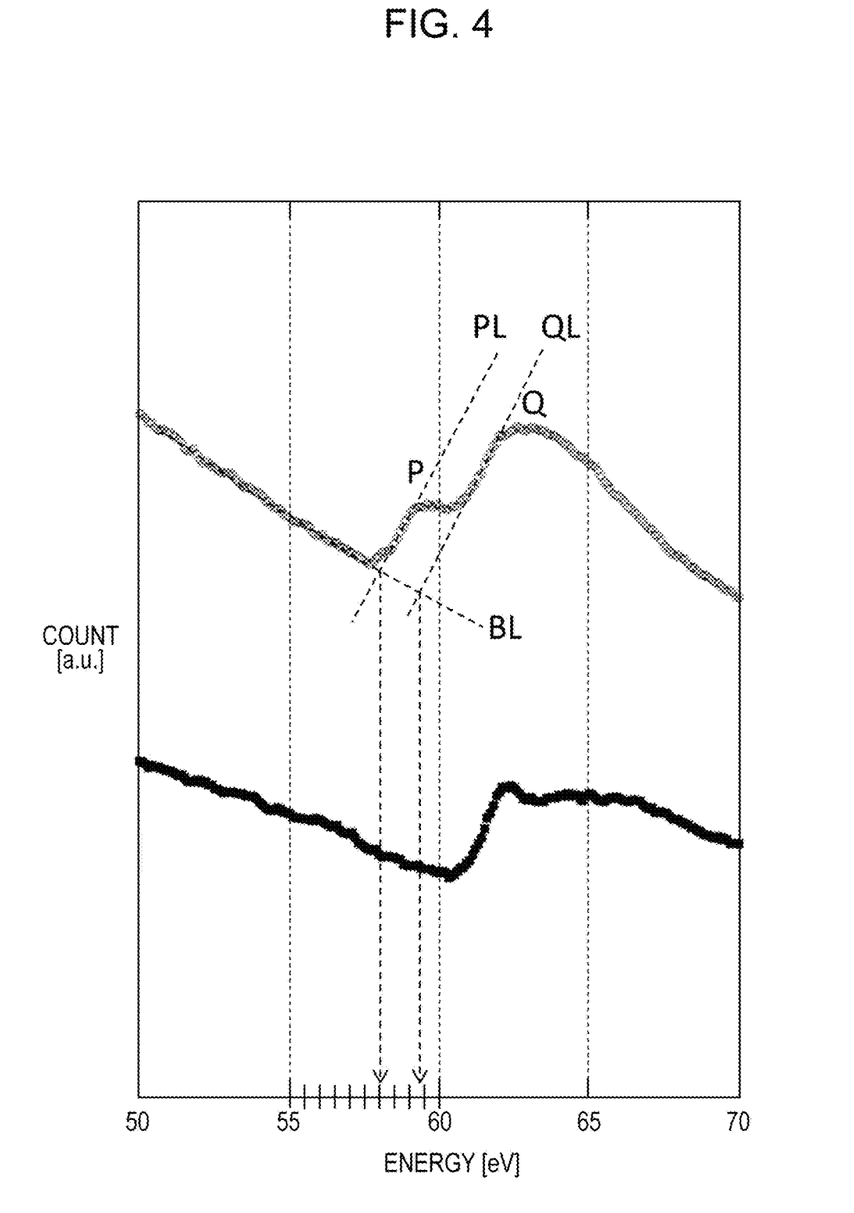
FIG. 4 is a diagram for illustrating the energy levels of rises in the TEM-EELS spectra.

Li K-edge EELS spectra A and B in Example, measured in the intermediate layer 4 and the cathode active material 3, respectively, indicate clearly different electronic states. EELS spectrum B, measured in the cathode active material 3 ($LiCoO_2$), exhibited an overlap of a relatively steeply rising Li K-edge and a Co $M_{2,3}$-edge that rose at a close energy level. This finding is consistent with the EELS spectrum of $LiCoO_2$ presented in Jun Kikkawa et al., *Applied Physics Letters* 104, 114105 (2014) (hereinafter "Kikkawa"). In contrast, EELS spectrum A, measured in the intermediate layer 4, exhibited two peaks P and Q rising relatively gently. The energy level where peak P rose was lower than that for peak Q by approximately 1.3 eV. In the present disclosure, as illustrated in FIG. 4, the value of "the energy level at which the Li K-edge rises" corresponds to the energy level at which the background BL of the EELS spectrum crosses the tangent PL to the point where peak P clearly rises. Likewise, the value of "the energy level at which the Co $M_{2,3}$-edge rises" corresponds to, as illustrated in FIG. 4, the energy level at which the background BL of the EELS spectrum crosses the tangent QL to the point where peak Q clearly rises.

EELS spectrum A apparently resembles Kikkawa's $Li_xCoO_2$ (x<1) crystal spectrum. As stated, however, the intermediate layer 4 has no crystal structure. Thus, the intermediate layer 4 in Example was not a $Li_xCoO_2$ crystal. In Kikkawa's $Li_xCoO_2$ (x<1) crystal spectrum, furthermore, peaks P and Q rise at similar energy levels unlike in spectrum A in this example.

As can be inferred from the EELS spectrum of $Co_3O_4$ presented in Kikkawa, too, the major component of peak Q is the Co $M_{2,3}$-edge. Kikkawa also suggests that changes in the valency of Co have little influence on the energy level at which the Co $M_{2,3}$-edge rises because of a small electron shielding effect. Peak P is therefore mainly derived from the Li K-edge. Presence of a space charge layer or an electric double layer in and/or near the intermediate layer 4 may shift the entire spectrum, but even in such a case, the energy level in the spectrum of the intermediate layer 4 at which the Li K-edge rises, relative to that for the Co $M_{2,3}$-edge, is lower than that in the spectrum of the cathode active material 3 by 1 eV or more.

The difference in the energy level at which the Li K-edge rises between the intermediate layer 4 and the cathode active material 3 seems to be derived from the difference in the shielding effect of valence electrons distributed around the 1 s electrons of lithium ions in each layer. For example, as stated in V. Mauchamp et al., "*EELS study of Li-based materials: ELNES at the lithium K-edge and low energy losses*", Book of Abstracts—EDGE 2005, p 126, the energy level at which the Li K-edge rises becomes lower in the order of $LiMn_2O_4$, $Li_2O$, and metallic lithium, namely, with decreasing ionicity of lithium ions (i.e., increasing tendency to form covalent bonds).

The cross-sectional TEM image in FIG. 3B demonstrates that in Comparative Example there was no clearly recognizable intermediate layer between the cathode active material 3 and the solid electrolyte 5. Furthermore, EELS spectrum C, measured in the region between the cathode active material 3 and the solid electrolyte 5, was similar to spectrum D, which was measured in the $LiCoO_2$-based cathode active material 3, having no peak corresponding to peak P in FIG. 3A. Even if there were an intermediate layer in the cathode active material 3 and the solid electrolyte 5 in Comparative Example, therefore, this intermediate layer would contain lithium ions with similar ionicity to those in $LiCoO_2$ or only few lithium ions unlike the intermediate layer 4 in Example.

The relationship between the ionicity and conduction of lithium ions will be as follows. A higher ionicity of lithium ions leads to a greater degree of localization of positive charge at the lithium ions, a greater degree of localization of negative charge at the framework (e.g., atomic nuclei and valence electrons) around the lithium ions, and therefore stronger Coulombic attraction between the positive and negative charges. Such lithium ions require high energy to be conducted through the framework. In contrast to this, a lower ionicity of lithium ions leads to greater degrees of localization of positive and negative charges and therefore weaker Coulombic attraction between them. Such lithium ions can be conducted through the framework needing relatively low energy. This seems to be the reason for the easy conduction of lithium ions through the intermediate layer 4 and the low resistance of the cathode active material 3 and the solid electrolyte 5 in the all-solid-state battery 1 of Example. If the all-solid-state battery of Comparative Example had an intermediate layer in which lithium ions were abundant, it would be difficult to conduct the lithium ions through the intermediate layer, and the resistance between the cathode active material 3 and the solid electrolyte 5 would be high. If the all-solid-state battery of Comparative Example had an intermediate layer in which lithium ions were scarce, the depletion of lithium ions would lead to the formation of a space charge layer, and this space charge layer would inhibit the conduction of the lithium ions, resulting in high resistance.

In this way, the all-solid-state battery 1 according to this embodiment was found to be compatible with quick charge and discharge because of the presence of the intermediate layer 4. Containing the same elements as the cathode active material 3 and able to be formed simultaneously with the solid electrolyte 5, the intermediate layer 4 according to this embodiment is expected to contribute to cost reduction. Furthermore, the intermediate layer 4, which serves its function without containing any element unique to the solid electrolyte 5, should have the effect described above even if the solid electrolyte 5 is any substance other than LiPON.

In this embodiment, when the cathode active material 3 contains Co, the difference between the energy level at which the Li K-edge rises in an EELS spectrum of the intermediate layer and that for the Co $M_{2,3}$-edge is generally 1 eV or more, although varying to some extent according to factors such as the degree of hydroxy termination on the surface of the cathode active material 3 and the material and conditions selected for the formation of the solid electrolyte 5.

The all-solid-battery 1 may not be a thin-film battery. The technology according to the present disclosure may also be applied to all-solid-state batteries in which a bulk material, such as a powder, is used.

The cathode active material 3 may not be lithium cobalt oxide. Other examples of substances of the cathode active material 3 include lithium manganese oxide, lithium nickel oxide, lithium titanium oxide, lithium niobium oxide, lithium iron oxide, lithium magnesium oxide, lithium copper oxide, lithium molybdenum oxide, lithium tantalum oxide, lithium tungsten oxide, lithium calcium oxide, lithium zinc oxide, and vanadium oxides. The cathode active material 3 can also be a composite oxide that contains lithium and two or more transition metals, such as lithium-nickel-manganese oxide or lithium-nickel-cobalt-aluminum oxide.

The all-solid-state lithium-ion secondary battery and the method for manufacturing it according to certain aspects of the present disclosure can be used as, for example, a storage for electricity or a power source in the field of environmental energy, such as that for electric vehicles, or a power supply for mobile electronics such as personal computers, smartphones, tablets, handheld gaming consoles, and video cameras. Other possible applications include an auxiliary secondary battery for electric motors in vehicles such as hybrid electric vehicles and fuel-cell vehicles, a power supply for machines such as electric tools, vacuum cleaners, and robots, and a power source for plug-in HEVs.

What is claimed is:

1. An all-solid-state lithium-ion secondary battery comprising:
   a cathode active material that allows a lithium ion to be stored therein and released therefrom;
   an anode active material that allows a lithium ion to be stored therein and released therefrom;
   a solid electrolyte between the cathode active material and the anode active material, the solid electrolyte having lithium ion conductivity; and
   an intermediate layer between the solid electrolyte and the cathode active material, the intermediate layer being constituted of elements including all elements constituting the cathode active material, a lithium ion in the intermediate layer being less ionic than the lithium ion stored in the cathode active material.

2. The all-solid-state lithium-ion secondary battery according to claim 1, wherein:
   the cathode active material is lithium cobalt oxide.

3. The all-solid-state lithium-ion secondary battery according to claim 2, wherein:
   in an electron energy loss spectrum of the intermediate layer, an energy level at which a Li K-edge rises is lower than an energy level at which a Co $M_{2,3}$-edge rises by 1 eV or more.

4. The all-solid-state lithium-ion secondary battery according to claim 1, wherein:
   the elements constituting the intermediate layer exclude any element constitutive of the solid electrolyte but not constitutive of the cathode active material.

* * * * *